United States Patent [19]

Preiswerk et al.

[11] Patent Number: 4,548,610

[45] Date of Patent: Oct. 22, 1985

[54] PROCESS FOR THE PREPARATION OF SOLID PHOTOACTIVATOR FORMULATIONS: SULPHONATED ZINC OR ALUMINUM PHTHALOCYANINE SOLUTIONS

[75] Inventors: Werner Preiswerk, Binningen; Beat Bruttel, Böckten, both of Switzerland

[73] Assignee: Ciba-Geigy Corporation, Ardsley, N.Y.

[21] Appl. No.: 590,930

[22] Filed: Mar. 19, 1984

[30] Foreign Application Priority Data

Mar. 25, 1983 [CH] Switzerland ............... 1642/83

[51] Int. Cl.$^4$ ............... C09B 47/20; C09B 67/54; C11D 3/39; D06L 3/12
[52] U.S. Cl. ............... 8/101; 8/103; 8/137; 252/301.16; 252/301.21; 260/245.82; 260/245.86
[58] Field of Search ............... 8/101, 103, 137

[56] References Cited

U.S. PATENT DOCUMENTS

| | | | |
|---|---|---|---|
| 4,166,718 | 9/1979 | Reinert et al. | 8/111 |
| 4,390,342 | 6/1983 | Bruttel et al. | 8/524 |
| 4,394,125 | 7/1983 | Hölzle et al. | 8/103 |
| 4,405,329 | 9/1983 | Abel et al. | 8/527 |
| 4,466,900 | 8/1984 | Horlacher et al. | 252/301.23 |

FOREIGN PATENT DOCUMENTS

| | | |
|---|---|---|
| 369281 | 6/1982 | South Africa . |
| 673081 | 10/1982 | South Africa . |
| 1359898 | 7/1974 | United Kingdom . |
| 2015018 | 9/1979 | United Kingdom . |

OTHER PUBLICATIONS

Chemical Abstract, vol. 95, 1981, 117056.

*Primary Examiner*—A. Lionel Clingman
*Attorney, Agent, or Firm*—Edward McC. Roberts; Kevin T. Mansfield

[57] ABSTRACT

The invention relates to a process for the preparation of solid photoactivator formulations containing sulfonated zinc or aluminum phthalocyanines. The process comprises passing a crude solution containing these compounds through a semipermeable asymmetrical membrane having a pore diameter of 1 to 500 Å and drying the photoactivator solution obtained under mild conditions. The membrane consists of a basic structure of cellulose acetate, polyacrylonitrile or a copolymer of acrylonitrile and other ethylenically unsaturated monomers. This basic structure is modified in a specific manner with ionic groups. If desired, fillers and/or surfactants customarily employed in the detergent industry may be added to the concentrated solution before it is dried.

The solid photoactivator formulations so obtained have excellent storage stability, are substantially non-hygroscopic, and contain exceedingly small amounts of undesirable organic impurities.

24 Claims, No Drawings

PROCESS FOR THE PREPARATION OF SOLID PHOTOACTIVATOR FORMULATIONS: SULPHONATED ZINC OR ALUMINUM PHTHALOCYANINE SOLUTIONS

The present invention relates to a process for the preparation of solid photoactivator formulations which contain sulfonated zinc and/or aluminium phthalocyanines as photoactivators, and to the storage-stable formulations so obtained.

Sulfonated zinc and aluminium phthalocyanines are known to be excellent photoactivators which are used principally as photo-bleaching agents and also, where appropriate, as microbicides. Reference is made in this connection to the following publications: U.S. Pat. No. 3,927,967, 4,094,806, 4,033,718, 4,256,597, 4,256,598, 4,318,883, 4,166,718, 4,311,605, and European published patent application No. 47 716. These sulfonated zinc and aluminium phthalocyanines are used e.g. as bleach photoactivators in various detergents.

Up to now it has proved extremely difficult to prepare suitable physical forms of the photoactivators referred to above. The sulfonated phthalocyanines are usually obtained from the synthesis in comparatively impure form. As a rule they contain up to 30% of organic and inorganic byproducts. These latter substances are mainly salts such as NaCl and $Na_2SO_4$. The organic byproducts comprise a wide range of compounds, some of which have not yet been identified, for example in a concentration of up to 15%. These byproducts are highly undesirable, as they could impair for example the effectiveness of the photoactivator. Efforts have been made to separate these byproducts by chemical means, but the results were not entirely satisfactory. The aqueous solutions so obtained still did not contain the photoactivator in the desired high concentration and were also not sufficiently storage-stable. A further shortcoming of these liquid formulations was that they often gelled, i.e. their viscosity increased, so that they were scarcely pourable. This problem arose in particular with sulfonated aluminium phthalocyanine. A further basic drawback of liquid physical forms is that they are comparatively bulky and thus create transportation problems.

If, however, the photoactivators are used in the dried powder form in which they are obtained from the synthesis, drawbacks also occur. These powders have a propensity to dust formation, they are not sufficiently storage-stable and they also contain the undesirable impurities referred to above. The cold water solubility and abrasion resistance are also unsatisfactory. Further, such powders are hygroscopic. An aqueous solution prepared therefrom also tends to gel in the same way as the liquid formulations.

It is the object of the present invention to provide a physical form for the cited photoactivators that does not have the shortcomings discussed above. In particular, it is the object of the invention to provide a solid, storage-stable, dust-free physical form having as low a content as possible of organic impurities.

Surprisingly, it has been found that the above object is accomplished by passing an unpurified solution of the photoactivators through a specific modified semipermeable membrane and drying the concentrated aqueous solution so obtained under mild conditions, preferably granulating it.

Membrane separation processes are known e.g. from German Offenlegungsschrift specifications Nos. 22 04 725, 28 05 891 and 29 48 292, and from published European patent application 59 782. U.S. Pat. No. 4,390,342 describes a process for the preparation of solid dye formulations, in particular of formulations containing reactive dyes, by means of a membrane separation process in which, if desired, various formulation assistants are added to said formulations. In none of the cited publications is it described or suggested that it is possible to obtain, by the process of this invention, solid photoactivator formulations of excellent storage stability and high bulk density, which are not hygroscopic, do not cake, have excellent cold water solubility and, surprisingly, which contain extremely few troublesome organic impurities (compared with the prior art formulations), and which form solutions with water which do not gel.

The process of this invention for the preparation of solid photoactivator formulations which contain sulfonated zinc and/or aluminium phthalocyanines comprises passing a crude solution containing said photoactivators through a semipermeable asymmetrical membrane having a pore diameter of 1 to 500 Å and consisting of a cellulose acetate basic structure which is modified by reaction with an ionic compound which contains reactive groups, or which consists of a basic structure which contains polyacrylonitrile or a copolymer of acrylonitrile and other ethylenically unsaturated monomers, and which is modified by reaction with hydroxylamine and subsequent reaction with a polyfunctional monomer, a polyfunctional polymer, and an ionic compound which contains reactive groups, and subsequently drying the concentrated photoactivitor solution so obtained under mild conditions and, if desired, adding fillers and/or surfactants conventionally used in the detergent industry before drying said solution.

The semipermeable membranes suitable for use in the process of this invention shall be able to retain higher molecular substances while ensuring a high rate of flow of water and dissolved compounds having a low molecular weight, e.g. salts such as sodium chloride, sodium sulfate, potassium chloride, ammonium sulfate, sodium phosphate, potassium sulfate, sodium acetate or low molecular impurities, e.g. unreacted or partially decomposed starting materials. However, they should also be able to separate differently charged ions.

The retention or separation (cut-off level) is determined by the molecular weight and/or the ionic charge. This so-called membrane hyperfiltration is also called reverse osmosis and is related to ultrafiltration. This term will be understood as meaning separation procedures in the molecular range.

The membranes employed in the process of this invention are semipermeable, ionic asymmetrical membranes having a pore diameter of 1 to 500 Å. They have a cut-off level in the range for example from 300 to 500. Membranes with a cut-off level of 400 to 500 are particularly suitable for the process of this invention. They allow water and dissolved substances whose molecular weight is below the cut-off level to pass through at high rates per unit of area and at low to medium pressure. Pressures of e.g. 10 to 100 bar, preferably of 10 to 30 bar and, most preferably, of 20 to 30 bar are applied in the process of the invention. The pressure may be applied e.g. by means of a pump.

In a single passage through the membrane, the degree of demineralization, without loss of photoactivator, can be up to 70% and more. Moreover, the volume of the solution of the retained substances (in the concentrate) decreases correspondingly and the concentration of the retained portion increases. If a further reduction of the low molecular constituents is desired, this may be accomplished without difficulty after conveniently diluting the retained solution or suspension with water to the initial volume by repeating the process once or more than once. The separation may also be carried out continuously by adapting the rate of addition of water to that of the decrease in the permeate.

The membranes suitable for use in the process of the invention have a basic structure of cellulose acetate, polyacrylonitrile or a copolymer of acrylonitrile and other ethylenically unsaturated momomers, said basic structure being modified in the manner described above. In practice, membranes based on cellulose acetate have proved advantageous.

Suitable reactive reagents containing an ionizable group are colourless and coloured compounds, for example ionic reactive dyes which may belong to different classes such as anthraquinone, azo or formazane dyes. Suitable colourless compounds are, for example, derivatives of 4,4'-diaminostilbene-2,2'-disulfonic acid, for example 4,4'-bis-(4'',6''-dichlorotriazin-2''-yl)-aminostilbene-2,2'-disulfonic acid and similar compounds. Typical examples of reactive groups which make it possible to attach these reagents to the starting poymers are: carboxylic acid halide groups, sulfonic acid halide groups, radicals of $\alpha,\beta$-unsaturated carboxylic acids or amides, for example radicals of acrylic, methacrylic, $\alpha$-chloroacrylic or $\alpha$-bromoacrylic acid, acrylamide radicals, radicals of, preferably, lower haloalkylcarboxylic acids, for example radicals of chloroacetic acid, $\alpha,\beta$-dichloropropionic acid or $\alpha,\beta$-dibromopropionic acid; radials of fluorocyclobutanecarboxylic acids, for example radicals of trifluorocyclobutanecarboxylic or tetrafluorocyclobutanecarboxylic acid; radicals containing vinylacyl groups, for example vinylsulfonyl groups or carboxyvinyl groups; radicals containing ethylsulfonyl groups ($-SO_2CH_2CH_2OSO_2OH$ or $-SO_2CH_2CH_2Cl$) or ethylaminosulfonyl gruops ($-SO_2NHCH_2CH_2OSO_2OH$) and halogenated heterocyclic radicals, for example radicals of dihaloquinoxalines, dihalopyridazones, dihalophthalazines, halobenzthiazoles or, preferably, halogenated pyridines or 1,3,5-triazines, for example radicals of monohalotriazines, dihalotriazines, 2,4-dihalopyrimidines or 2,5,6-trihalopyrimidines. Suitable halogen atoms in the above radicals are fluorine, bromine and, in particular, chlorine atoms.

Examples of suitable ionizable groups are sulfato groups, sulfonic acid groups, sulfonamide groups, carboxylic acid groups, carboxamide groups, hydroxyl groups, thiol groups, isocyanate and/or thioisocyanate groups, ammonium groups formed from primary, secondary or tertiary amino groups and hydrogen, or quaternary ammonium groups, and also phosphonium or sulfonium groups. Preferred reactive compounds (reactive dyes) are those containing sulfonic acid, carboxylic acid or ammonium groups.

Particularly advantageous results are obtained in some cases using compounds containing sulfonic acid groups.

Particularly useful and versatile polymer membranes are those which are modified by an azo dye which contains sulfonic acid groups. The azo dye may also contain a complexed metal, e.g. copper.

Membranes obtained from (partially acetylated) cellulose acetate may be modified e.g. by direct reaction with the reactive ionic compounds previously referred to, especially anionic reactive dyes. Such membranes are described e.g. in U.S. Pat. No. 4,247,401.

A further modification of cellulose acetate may be effected e.g. by chemical reaction (in the indicated sequence) with: (1) a polyfunctional monomer containing at least two functional groups (e.g. cyanuric chloride); (2) a polyfunctional oligomer or polymer (e.g. polyethyleneimine); and (3) an ionic compound (e.g. ionic reactive dye which contains reactive groups and ionic groups of the kind indicated above). Such modified cellulose acetate membranes are described e.g. in European published patent application No. 26 399.

The polyfunctional monomer preferably contains at least two functional groups. Examples of suitable compounds are cyclic carbonimide halides, isocyanates, isothiocyanates or N-methylol compounds, with halodiazines or halotriazines, e.g. cyanuric halides, preferably cyanuric chloride, or tri- or tetrahalopyrimidines, preferably tetrachloropriidine, being particularly suitable.

The polyfunctional oligomers or polymers preferably contain aliphatic or aromatic amino, hydroxyl, thiol, isocyanate and/or isothiocyanate groups. Suitable polyfunctional polymers are e.g. polyethyleneimine, polyvinyl alcohol, cellulose derivatives, polyvinylamine or polyvinyl aniline, with polyethyleneimine being preferred. The membrane preferably contains, as ionic groups, sulfonic acid, carboxylic acid or ammonium groups. Membranes which contain the radicals of an anionic reactive dye are particularly advantageous.

Membranes consisting of a basic structure which contains polyacrylonitrile or a copolymer of acrylonitrile and other ethylenically unsaturated monomers are described e.g. in European published patent application 25 973. The preparation of modified membranes of this type which can be used in the process of this invention is described in U.K. published patent application No. 2 058 798. The basic structure of the membrane is reacted with hydroxylamine (introduction of amidoxime groups) and then modified in the same manner as the cellulose acetate membranes in European published patent application 26 399.

The content of acrylonitrile units in the basic structure of the membrane is advantageously at least 5% by weight and preferably at least 20% by weight. Preferred are copolymers of acrylonitrile and vinyl acetate, vinyl ethers, vinyl pyridine, vinyl chloride, styrene, butadiene, acrylic acid, methacrylic acid, maleic anhydride, 2-aminomethylmethacrylate or allyl compounds or also terpolymers or tetrapolymers of acrylonitrile.

The so modified membranes may also in addition be subjected to a heat treatment ("tempering"), by means of which the pore size of the membrane skin is substantially determined. The membrane is treated e.g. for 1 to 30 minutes at a temperature in the range from 60° to 90° C., conveniently by immersing it in warm water. If appropriate, the heat treatment may also be carried out before the reaction with the reactive compound which contains ionisable groups. Further, the reaction may also be carried out before the polymeric material is processed to the asymmetrical membrane.

The membranes may be in different forms, e.g. disc-shaped, lamellar, tube-shaped, or in the form of a bag, cone or hollow fibres. In order to use them effectively for the separation of organic and inorganic substances, it is necessary to integrate them into appropriate systems (modules) and to incorporate them into units (for pressure permeation).

The pore size can be varied by graduated tempering within the temperature range indicated above. The mean charge density (equal to the content of ionisable groups) of the membrane will conveniently be 1 to 100 milliequivalents per kg of dry membrane.

The solid formulations prepared according to this invention contain sulfonated zinc or aluminum phthalocyanines, or mixtures thereof, as photoactivators. Preferred photoactivators are sulfonated phthalocyanines of the formula

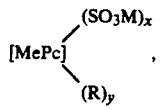 (1)

wherein MePc is the zinc or aluminum phthalocyanine ring system, M is hydrogen, an alkali metal ion or an ammonium ion, R is fluorine, chlorine, bromine or iodine, x is any value from 1.3 to 4 and y is any value from 0 to 4, with the proviso that substituents R in the molecule may be identical or different, or mixtures thereof.

It is particularly preferred to prepare solid formulations of phthalocyanine photoactivators of the formula

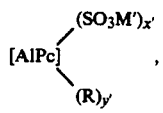 (2)

wherein AlPc is the aluminum phthalocyanine ring system, M' is hydrogen, sodium or potassium, R is fluorine, chlorine, bromine or iodine, x' is any value from 2 to 4 and y' is any value from 0 to 1.5; and those of the formula

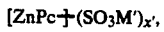 (3)

wherein ZnPc is the zinc phthalocyanine ring system, M' is hydrogen, sodium or potassium and x' is any value from 2 to 4.

The sulfonated aluminum and zinc phthalocyanines are obtained from the synthesis as crude solutions or dispersions or as filter cakes which, in addition to water, contain up to about 20% of organic byproducts (starting materials, decomposition products etc.) and also up to about 20% of neutral salts (electrolytes). These last mentioned substances originate mainly from the neutralisation and/or from salting out the phthalocyanine sulfonates from the synthesis solution. Such salts are e.g. alkali metal and alkaline earth metal salts such as ammonium, magnesium, sodium or potassium chloride and the corresponding sulfates or hydrogen sulfates, in particular sodium sulfate and, most particularly, sodium chloride. The first step of the process of the invention is carried out by passing the reaction mixture obtained directly in the synthesis, or an aqueous suspension of the moist filter cake referred to above, or of the already dried product, through the semipermeable membrane in the manner described above.

In the second step of the process of this invention, the concentrated aqueous photoactivator solution obtained after passage through the membrane is dried under mild conditions. Drying can be carried out in any known apparatus suitable for drying or granulating a solid obtained from a liquid formulation. Examples of suitable driers are: spray driers (for example jet atomisers, disc atomisers), grinder driers, e.g. of the "micron drier" type, or a fluid-bed drier. The drying can be carried out batchwise or continuously. In the process of this invention it is preferred to carry out the drying in a granulator, e.g. by spray granulation, for example in a jet atomiser equipped with granulator.

The solution obtained from the first step (passage through the membrane) can be dried directly (without the addition of further substances), affording a powder with a very high concentration of photoactivator and otherwise containing only residual moisture and very insignificant amounts of inorganic salts (NaCl, Na$_2$SO$_4$) and organic by-products formed during the synthesis. To improve the mechanical properties and, in particular, to prepare a granulated physical form, it is often advantageous to add fillers and/or surfactants before the drying step, preferably those which are customarily employed in the detergent industry and which are also suitable components of detergents (washing powders). The advantage of adding such components is that, when incorporating the photoactivator in detergent compositions (especially in the slurry of the washing powder), no troublesome impurities which might impair the effectiveness of the detergent composition find their way into the composition.

Examples of suitable fillers are alkali metal sulfates, carbonates, borates, phosphates, polyphosphates, bicarbonates and silicates, aminopolycarboxylates (e.g. sodium ethylenediaminetetraacetate), phytates, polyphosphonates and polycarboxylates, carboxymethyl cellulose, polysiloxanes or aluminium silicates, preferably alkali metal chlorides, phosphates and sulfates, e.g. NaCl, Na$_3$PO$_4$ and Na$_2$SO$_4$, with Na$_2$SO$_4$ being especially preferred.

The surfactants may belong to the customary anionic, nonionic, semipolar, ampholytic and/or zwitterionic classes. Examples are: soaps, soluble salts of sulfonic acid hemiesters of higher fatty alcohols, arylsulfonic acids containing higher and/or multiple alkyl substituents, sulfocarboxylic acid esters of medium to higher alcohols, fatty acid acylaminoalkyl or acylaminoaryl glycol sulfonates, phosphoric acid esters of fatty alcohols etc., in particular alkylbenzenesulfonates, alkylsulfates, ethoxylated alkyl ether sulfates, paraffin sulfonates, α-olefin sulfonates, α-sulfocarboxylic acids and salts and esters thereof, alkyl glyceryl ether sulfonates, fatty acid monoglyceride sulfates or sulfonates, alkylphenol polyethoxy ether sulfates, 2-acyloxyalkane sulfonates, β-alkyloxyalkane sulfonates, soaps, ethoxylated fatty alcohols, alkylphenols, polypropoxy glycols, polypropoxyethylenediamines, amine oxides, phosphine oxides, sulfoxides, aliphatic secondary and tertiary amines, aliphatic quaternary ammonium, phosphonium and sulfonium compounds, or mixtures of the above surfactants.

The powders, preferably granulates, obtained are substantially dustless, i.e. they contain very few or no particles of less than 50 μm. If necessary, small amounts of such particles can additionally be removed mechanically, e.g. with an air-jet sieve. The formulations so obtained have a particle size in the range from 50–2000 μm, e.g. from 60–1000 μm. In addition to the dustlessness referred to above, the formulations of this invention have excellent mechanical strength (e.g. abrasion resistance), good storage stability, low hygroscopicity, good cold water solubility and wettability. The aqueous solutions of these formulations do not gel, as do solutions of sulfonated zinc and aluminium phthalocyanine photoactivators prepared by known methods. Further, mention is again made of the exceedingly low content of troublesome organic impurities (especially synthesis by products).

In a particularly preferred embodiment of the invention, sodium sulfate is added to the concentrated photoactivator solution obtained after passage through the membrane, and dried by spray granulation. The amount of sodium sulfate added is such that the photoactivator granulate contains e.g. 1 to 60% by weight, preferably 10 to 60% by weight and, most preferably, 35 to 60% by weight of $Na_2SO_4$. It is advantageous to add $Na_2SO_4$ in an amount corresponding to the concentration of photoactivator present in the solution. The photoactivator formulations obtained after addition of $Na_2SO_4$ have particularly good storage stability and low water absorption. The granulate so obtained is very readily flowable and has the advantages recited above of the formulations of the invention to a particularly high degree.

The solid photoactivator formulations obtained by the process of the invention themselves also constitute an object of the invention. They contain e.g. 30–97% by weight of a sulfonated zinc and/or aluminum phthalocyanine, in particular of the formula (1), 0–60% by weight of a filler conventionally employed in the detergent industry and/or of a surfactant, 2 to 10% by weight of residual moisture, 0.05 to 1% by weight of NaCl, and 0.1 to 2% by weight of organic byproducts.

Preferred photoactivator formulations contain 35 to 60% by weight of a sulfonated phthalocyanine of the formula (1), preferably of the formula (2) or (3), 35 to 60% by weight of $Na_2SO_4$, 3 to 8% by weight of residual moisture, 0.1 to 0.5% by weight of NaCl, and 0.1% by weight of organic byproducts.

In the following Examples parts and percentages are by weight, unless otherwise indicated.

EXAMPLES FOR THE PREPARATION OF PREFERRED MEMBRANES SUITABLE FOR USE IN THE PROCESS OF THE INVENTION

A. According to Example 1 of U.S. Pat. No. 4,247,401:

A solution is prepared from 25 g of cellulose acetate (degree of acetylation=39.8%), 45 g of acetone and 30 g of formamide. This solution is allowed to stand for 3 days, then poured onto a glass plate on which it is coated with a spatula to a thickness of 0.6 mm. The solvent is allowed to evaporate for 5 seconds at 25° C., then the glass plate is placed in ice-water for 2 hours and the membrane so obtained is stripped off from the plate. The membrane is then immersed in a 5% aqueous solution of the 1:2 chromium complex of the dye of the formula

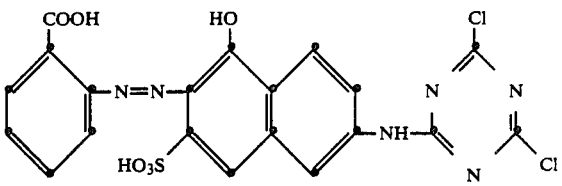

and kept in this solution for 48 hours at pH 6 and a temperature of 25° C. The pH of the dye solution is then adjusted to 10.4 with sodium hydroxide and the solution is continuously agitated for 2 hours at 25° C.

Instead of the treating the membrane in two steps with the dye solution, it is also possible to treat it in a single step for 2½ hours at pH 10.5 and 25° C. with a 10% solution of the chromium complex dye. For the subsequent heat treatment (tempering), the membrane is put for 10 minutes into water of 60° C.

The preparation of further suitable membranes is described in the remaining Examples of U.S. Pat. No. 4,247,401.

B. According to Example 1 of U.K. published patent application No. 2 058 798:

A membrane suitable for ultrafiltration having a maximum pore diameter of 115 Å and based on an acrylonitrile/vinyl acetate copolymer (85:15) and having the following retention capacity:
2% sodium chloride solution: 6%
1% sodium sulfate solution: 10%
dextrin (mol. wt. 70,000): 60%
1% solution of the dye of the formula (4): 34%

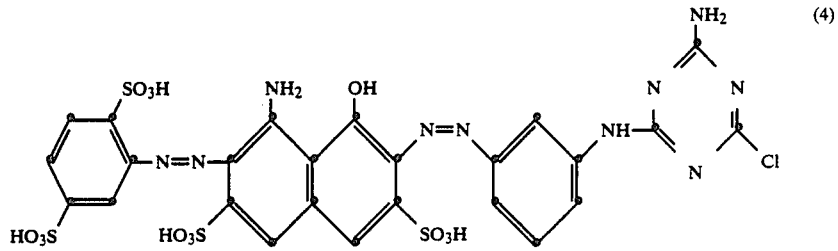

is treated for 5 minutes at 65° C. with an aqueous solution containing 10% of hydroxylamine and 7.5% of sodium carbonate and having a pH of 6.5. The membrane is then removed from the solution and put into a stirred solution of 370 mg of cyanuric chloride per 100 mg of membrane. This solution is kept at pH 10 for 30 minutes at 0° C. by the addition of 1N sodium hydroxide solution. The membrane is removed from this solution, washed with ice-water and put into a stirred 10% solution of polyethyleneimine (mol. wt. 40,000) and kept therein for 5 minutes at room temperature and pH 10. The membrane is removed from this solution and brought into contact with a solution which contains 4% of the dye of the formula

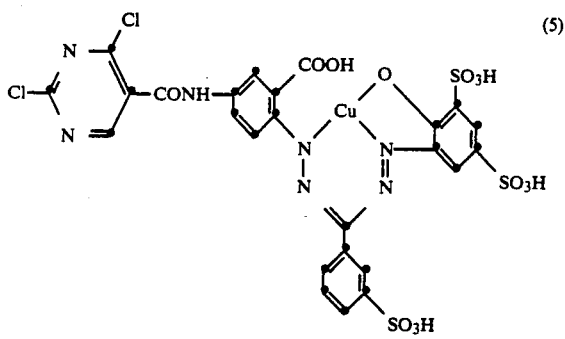

(5)

and 10% of sodium chloride, and kept in this solution for 15 minutes at room temperature. The membrane is then put into a 5% solution of sodium carbonate and kept therein for 30 minutes at room temperature. After this treatment, the rate of flow and the retention capacity of the membrane for different dyes, salts and complexes is determined.

The preparation of further suitable membranes is described in the remaining Examples of U.K. published patent specification No. 2 058 798.

C. According to Example 1 of European published patent application 26 399:

A cellulose acetate membrane (acetyl content 38.9%) having the following specifications:
molecular weight of dextrin (95% retention): 2000
maximum working pressure: 13 bar
pore diameter: 13 Å
retention capacity for a 2% solution of the dye of the formula (4): 82%
NaCl: 4.5%
$Na_2SO_4$: 15%
rate of flow of a 2% solution of the dye of the formula (4): 55 $l/m^2 \cdot h$
is modified as follows:

The membrane is treated for 15 minutes with a 5% solution of sodium bicarbonate and then for 2 hours with a 2% petroleum ether solution (boiling point: 80°–100° C.) of cyanuric chloride. After the treated membrane has been rinsed with cold water, it is put into a 20% polyethyleneminie solution (molecular weight 189), which has been adjusted to pH 9 with sodium hydroxide, and kept in this solution for 2 hours at 40° C. The membrane is then washed with water for 2 hours. It is then immersed in a solution which contains 5% of the reactive dye of the formula (5), 10% of sodium chloride and sufficient sodium carbonate to bring the pH to 10.5, and kept in this solution for 2 hours at room temperature. The membrane is subsequently tested for its retention capacity and the rate of flow.

The preparation of further suitable membranes is described in the remaining Examples of European published patent application 26 399.

EXAMPLE 1

In a pilot plant for reverse osmosis, a crude synthesis solution of $ZnPc(SO_3Na)_{c.4}$ (ZnPC=zinc phthalocyanine ring system), which has a solids content of about 13%, is passed through a modified cellulose acetate membrane (obtained e.g. in accordance with Preparatory Example A or C above) having a surface area of 0.25 $m^2$, under 25 bar overpressure, and concentrated for 6 hours while adding water in the same amount as the initial volume. To the photoactivator solution obtained having a solids content of about 25%, sodium sulfate is added in an amount corresponding to the amount of photoactivator present in the solution. The mixture obtained is dried to a granulate in a jet atomiser equipped with granulator. Particles of less than 60 μm are then separated from the granulate by means of an air-jet sieve. A substantially dustless formulation with high density and good abrasion resistance and having the following composition is obtained:

46.5% of $ZnPc(SO_3Na)_{c.4'}$
47.5% of $Na_2SO_{4'}$
0.15% of NaCl,
0.85% of organic by-products and
5% of residual moisture.

The formulation has the properties listed in the following table. For comparison purposes, the values for a formulation prepared in conventional manner (without purification and concentration by means of a semipermeable membrane) are included in the table.

TABLE

| Property and/or test method | Test value | |
|---|---|---|
| | formulation of the invention | comparison formulation |
| dust test | 4 | 3 |
| hygroscopicity (water absorption under test conditions) | 7.6% (flowable) | 18.4% ("fused") |
| abrasion resistance | 4 | 2 |
| solubility at 60° C. | 85 g/l | 65 g/l |
| bulk density | 0.63 kg/l | 0.48 kg/l |
| cold water solubility | 100 g/l | 64 g/l |
| suspension test | good wettability | moderate wettability |
| distribution of particle size (before sieving) | | |
| <60 μm | 6% | 18% |
| 60–350 μm | 74% | 72% |
| >350 μm | 20% | 10% |
| storage stability (3 months at room temperature) | −2.1%* | −4.2%* |

*loss of activity

The test procedure and the evaluation criteria reported in the table (dust test, abrasion resistance, solubility at 60° C., cold water solubility, bulk density and suspension test) are described in U.S. Pat. No. 4,390,342, columns 11–13.

It is also possible to use a membrane obtained according to Preparatory Example B or any other membrane as defined in this specification.

EXAMPLE 2

Following the procedure of Example 1, an unpurified synthesis solution of $AlPcCl(SO_3Na)_{3-4}$ (AlPc=aluminum phthalocyanine ring system) is purified and concentrated by reverse osmosis using a modified membrane. The solid storage-stable formulation obtained has a composition corresponding to that indicated in Example 1, but contains $AlPcCl(SO_3Na)_{3-4}$ as active ingredient instead of $ZnPc(SO_3Na)_{c.4}$. The tests carried out with the granulate so obtained yield results similar to those reported in the table of Example 1.

The solid photoactivator formulations obtained by the process of the invention can be further processed in conventional manner. For example, they can be added in the appropriate amount, optionally after dilution with water, to the slurry of a washing powder or to liquid detergent compositions.

What is claimed is:

1. A process for the preparation of a solid photoactivator formulation containing a sulfonated zinc or aluminum, phthalocyanine which comprises passing a crude solution containing said photoactivator, through a semipermeable asymmetrical membrane having a pore diameter of 1 to 500 Å and which consists of cellulose acetate which is modified by reaction with an ionic compound which contains hydroxyl-reactive groups, or which consists of polyacrylonitrile or a copolymer of acrylonitrile and another ethylenically unsaturated, monomer, and which is modified by reaction with hydroxylamine and subsequent reaction with a polyfunctional monomer selected from the group consisting of cyclic carbonimide halides, isocyanates, isothiocyanates and N-methlol compounds, then a polyfunctional polymer selected from the group consisting of polyethyleneimine, polyvinyl alcohol, polyvinylamine or polyvinyl aniline, and finally with an ionic compound which contains hydroxyl- or amino-reactive groups to yield a non-gelling concentrated activator solution and subsequently drying said concentrated photoactivator solution in a spray dryer, a grinder dryer or a fluidized-bed dryer.

2. a process according to claim 1, wherein the membrane consists of cellulose acetate which is modified by reaction with a polyfunctional monomer selected from the group consisting of cyclic carbonimide halides, isocyanates, isothiocyanates and N-methylol compounds, then a polyfunctional polymer selected from the group consisting of polyethyleneimine, polyvinyl alcohol, polyvinylamine or polyvinyl aniline, and finally with an ionic compound which contains hydroxyl- or amino-reactive groups.

3. A process according to claim 1 or 2, wherein the polyfunctional polymer contains aliphatic or aromatic amino groups, hydroxyl, thiol, isocyanate and/or isothiocyanate groups.

4. A process according to claim 1 or 2, wherein the membrane contains sulfonic acid, carboxylic acid or ammonium groups as ionic groups.

5. A process according to claim 1, wherein the membrane contains radicals of a water-soluble reactive dye as the ionic compound which contains reactive groups.

6. A process according to claim 1, wherein the basic structure of the membrane contains at least 5% of acrylonitrile units.

7. A process according to claim 6, wherein the basic structure of the membrane contains copolymers of acrylonitrile and vinyl acetate, vinyl ethers, vinyl pyridine, vinyl chloride, styrene, butadiene, acrylic or methacrylic acid, maleic anhydride, 2-aminomethylmethacrylate or allyl compounds or terpolymers or tetrapolymers of acrylonitrile.

8. A process according to claim 1, wherein the sulfonated zinc or aluminum phthalocyanine is of the formula

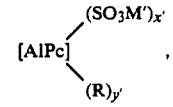

wherein MePc is the zinc or aluminum phthalocyanine ring system, M is hydrogen, an alkali metal ion or an ammonium ion, R is fluorine, chorine, bromine or iodine, x is any value from 1.3 to 4 and y is any value from 0 to 4, with the proviso that substituents R in the molecule may be identical or different, or a mixture thereof.

9. A process according to claim 8, wherein the phthalocyanine is of the formula

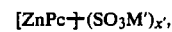

wherein AlPc is the aluminum phthalocyanine ring system, M' is hydrogen, sodium or potassium, R is fluorine, chlorine, bromine or iodine, x' is any value from 2 to 4 and y' is any value from 0 to 1.5.

10. A process according to claim 8, wherein the phthalocyanine is of the formula $$[ZnPc\text{---}(SO_3M')_{x'}],$$

wherein ZnPc is the zinc phthalocyanine ring system, M' is hydrogen, sodium or potassium, and x' is any value from 2 to 4.

11. A process according to claim 1, wherein the concentrated aqueous photoactivator solution is dried in a granulator by spray granulation.

12. A process according to claim 1, wherein the concentrated aqueous photoactivator solution is dried in a fluid bed drier.

13. A process according to claim 1, which comprises the further step of adding fillers or anionic, nonionic, semipolar, ampholytic or zwitterionic surfactants to the concentrated aqueous photoactivator solution before drying said solution.

14. A process according to claim 13, wherein the fillers employed are alkali metal sulfates, carbonates, borates, phosphates, polyphosphates, bicarbonates and silicates, aminopolycarboxylates, phytates, polyphosphonates and carboxylates, carboxymethyl cellulose, polysiloxanes or aluminium silicates.

15. A process according to claim 13, wherein the surfactants employed are alkylbenzenesulfonates, alkylsulfates, ethoxylated alkyl ether sulfates, paraffin sulfonates, α-olefin sulfonates, α-sulfocarboxylic acids and salts and esters thereof, alkyl glyceryl ether sulfonates, fatty acid monoglyceride sulfates or sulfonates, alkylphenol polyethoxy ether sulfates, 2-acyloxyalkane sulfonates, β-alkyloxyalkane sulfonates, soaps, ethoxylated fatty alcohols, alkylphenols, polypropoxy glycols, polypropoxyethylenediamines, amine oxides, phosphine oxides, sulfoxides, aliphatic secondary and tertiary amines, aliphatic quaternary ammonium, phosphonium and sulfonium compounds, or mixtures of the above surfactants.

16. A process according to claim 14, wherein sodium sulfate is added before drying and the solution is dried by spray granulation.

17. A solid photoactivator formulation obtained according to the process as claimed in claim 13, which formulation contains 30 to 97% by weight of a sulfonated aluminum or zinc phthalocyanine, 0 to 60% by weight of a filler or surfactant, 2 to 10% by weight of residual moisture, 0.05 to 1% by weight of NaCl, and 0.1 to 2% by weight of organic byproducts.

18. A formulation of claim 17 wherein the phthalocyanine is of the formula

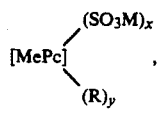

wherein MePc is the zinc or aluminum phthalocyanine ring system, M is hydrogen, an alkali metal ion or an ammonium ion, R is fluorine, chlorine, bromine or iodine, x is any value from 1.3 to 4 and y is any value from 0 to 4, with the proviso that substituents R in the molecule may be identical or different.

19. A formulation according to claim 17, which contains alkali metal sulfates, carbonates, borates, phosphates, polyphosphates, bicarbonates and silicates, aminopolycarboxylates, phytates, polyphosphonates and carboxylates, carboxymethyl cellulose, polysiloxanes or aluminium silicates as fillers.

20. A formulation according to claim 17, which contains alkylbenzenesulfonates, alkylsulfates, ethoxylated alkyl ether sulfates, paraffin sulfonates, α-olefin sulfonates, α-sulfocarboxylic acids and salts and esters thereof, alkyl glyceryl ether sulfonates, fatty acid monoglyceride sulfates or sulfonates, alkylphenol polyethoxy ether sulfates, 2-acyloxyalkane sulfonates, β-alkyloxyalkane sulfonates, soaps, ethoxylated fatty alcohols, alkylphenols, polypropoxy glycols, polypropoxyethylenediamines, amine oxides, phosphine oxides, sulfoxides, aliphatic secondary and tertiary amines, aliphatic quaternary ammonium, phosphonium and sulfonium compounds, or mixtures of the above surfactants as surfactants.

21. A formulation according to claim 17, which contains 35 to 60% by weight of a phthalocyanine photoactivator of claim 19, 35 to 60% by weight of $Na_2SO_4$, 3 to 8% by weight of residual moisture, 0.1 to 0.5% by weight of NaCl and 0.1 to 1% by weight of organic by-products.

22. A formulation according to claim 17, which contains a sulfonated phthalocyanine of the formula

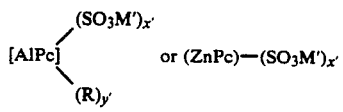

wherein AlPc is the aluminum phthalocyanine ring system, ZnPc is the zinc phthalocyanine ring system, M' is hydrogen, sodium or potassium, x' is any value from 2 to 4, R is fluorine, chlorine, bromine or iodine and y' is any value from 0 to 1.5.

23. A process according to claim 13, wherein the filler employed is sodium sulfate.

24. A formulation according to claim 17 wherein the filler employed is sodium sulfate.

* * * * *